(12) United States Patent
Mangal et al.

(10) Patent No.: US 8,059,663 B1
(45) Date of Patent: Nov. 15, 2011

(54) GATEWAY-BASED SYSTEM AND METHOD FOR TANDEM FREE OPERATION

(75) Inventors: Manish Mangal, Overland Park, KS (US); George Georgiou, Olathe, KS (US); Anand Chakraborty, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1225 days.

(21) Appl. No.: 10/616,679

(22) Filed: Jul. 10, 2003

(51) Int. Cl.
*H04L 12/28* (2006.01)
*H04L 12/56* (2006.01)

(52) U.S. Cl. .......................... 370/401; 455/436
(58) Field of Classification Search .................. 370/352; 455/436–444
See application file for complete search history.

(56) References Cited

U.S. PATENT DOCUMENTS

| | | | |
|---|---|---|---|
| 5,608,779 A * | 3/1997 | Lev et al. ................... | 455/436 |
| 5,768,308 A | 6/1998 | Pon et al. | |
| 5,793,810 A | 8/1998 | Han et al. | |
| 5,956,673 A | 9/1999 | Weaver et al. | |
| 5,987,327 A | 11/1999 | Lev et al. | |
| 5,995,923 A | 11/1999 | Mermelstein et al. | |
| 6,070,089 A * | 5/2000 | Brophy et al. .............. | 455/560 |
| 6,078,809 A | 6/2000 | Proctor | |
| 6,091,969 A | 7/2000 | Brophy et al. | |
| 6,138,022 A | 10/2000 | Strawczynski et al. | |
| 6,172,974 B1 | 1/2001 | Tseng et al. | |
| 6,185,424 B1 | 2/2001 | Pon et al. | |
| 6,215,996 B1 | 4/2001 | Fujita et al. | |
| 6,256,612 B1 | 7/2001 | Vo et al. | |
| 6,272,358 B1 | 8/2001 | Brent et al. | |
| 6,292,662 B1 | 9/2001 | Ziv et al. | |
| 6,351,495 B1 * | 2/2002 | Tarraf ........................... | 375/259 |
| 6,490,451 B1 * | 12/2002 | Denman et al. ............... | 455/436 |
| 6,574,469 B1 * | 6/2003 | Xiang et al. .................. | 455/416 |
| 6,611,694 B1 * | 8/2003 | Oltedal et al. ................ | 455/560 |
| 6,766,291 B2 | 7/2004 | Chu et al. | |
| 6,785,339 B1 | 8/2004 | Tahernezhaadi et al. | |
| 6,888,803 B1 * | 5/2005 | Gentry et al. ................. | 370/259 |
| 6,920,150 B1 * | 7/2005 | Pauls et al. ................... | 370/465 |
| 6,985,866 B2 | 1/2006 | Nakagaki | |
| 7,023,819 B2 | 4/2006 | Falsafi | |
| 7,120,447 B1 | 10/2006 | Chheda et al. | |
| 7,174,156 B1 * | 2/2007 | Mangal ........................ | 455/406 |
| 7,203,226 B1 | 4/2007 | Rabipour et al. | |

(Continued)

FOREIGN PATENT DOCUMENTS

WO     WO 96/19907 A1     6/1996

(Continued)

OTHER PUBLICATIONS

Written Opinion from International Application No. PCT/US03/21308, dated May 20, 2004.

(Continued)

*Primary Examiner* — Ayaz Sheikh
*Assistant Examiner* — Mounir Moutaouakil

(57) ABSTRACT

Mobile switching centers (MSCs) in serving systems are interconnected by gateways for tandem free operation. The serving systems route calls involving two mobile stations that use the same compressed digital format through the gateways. The gateways carry the media exchanged during the call in the compressed digital format in order to avoid tandem transcoding. When a serving system hands off a mobile station involved in a tandem free call, the call pathway is extended through the gateways so that the call remains tandem free.

4 Claims, 3 Drawing Sheets

U.S. PATENT DOCUMENTS

| | | | |
|---|---|---|---|
| 7,240,000 | B2 | 7/2007 | Harada |
| 7,406,319 | B2 | 7/2008 | Kostic et al. |
| 7,426,180 | B2 | 9/2008 | Xu |
| 2002/0075850 | A1* | 6/2002 | Cruz et al. ............... 370/352 |
| 2002/0191693 | A1 | 12/2002 | Nakagaki |
| 2003/0012221 | A1 | 1/2003 | El-Maleh et al. |
| 2003/0125960 | A1 | 7/2003 | Chu et al. |
| 2004/0009787 | A1 | 1/2004 | Oh et al. |
| 2005/0018769 | A1* | 1/2005 | Hellwig et al. ......... 375/240.12 |
| 2007/0053348 | A1* | 3/2007 | Koistinen ................. 370/352 |

FOREIGN PATENT DOCUMENTS

| | | | |
|---|---|---|---|
| WO | WO/00/31951 | * | 6/2000 |
| WO | WO 2004/008652 | | 1/2004 |
| WO | WO 2004/008679 | | 1/2004 |

OTHER PUBLICATIONS

International Search Report prepared for PCT Application No. PCT/US03/21196, dated Oct. 2, 2003.

International Search Report prepared for PCT Application No. PCT/US03/21308, dated Oct. 3, 2003.

Graham Rousell, "*The Implications of ETSI Tandem Free Operation (TFO) in GSM Networks*," Mobile Europe, Sep. 1999.

$3^{rd}$ Generation Partnership Project 2, "*Tandem Free Operation (Stage 1)*," Dec. 13, 1999.

$3^{rd}$ Generation Partneiship Project 2, "*CDMA Tandem Free Operation (Post SDO Ballot,Pre SDO Publication Version)*," Aug. 5, 2002.

Office Action, mailed Sep. 1, 2010, in U.S. Appl. No. 11/951,630.

* cited by examiner

GATEWAY-BASED SYSTEM AND METHOD FOR TANDEM FREE OPERATION

BACKGROUND

1. Field of the Invention

The present invention relates to wireless telecommunications and, more particularly, to systems and methods that use gateways for tandem free operation.

2. Description of Related Art

Mobile stations often transmit and receive voice and other media in a compressed digital format in order to reduce bandwidth. In particular, a mobile station may receive voice or other media from the user, digitize it, compress the digital signals in accordance with various algorithms, and then transmit the voice or other media in the compressed digital format. A mobile station that receives media in the compressed digital format decodes it in order to obtain the original signal. Mobile stations typically include vocoders to convert the voice or other media between analog and compressed digital formats. A number of different compressed digital formats are commonly used. One example is the Enhanced Variable Rate Codec (EVRC) format, which supports voice transmission at a data rate of about 8 kilobits per second (Kbps). The EVRC format is described in the standard "Enhanced Variable Rated Codec, Speech Service Option 3 for Wideband Spread Spectrum Digital Systems," TIA/EIA/IS-127 (published January 1997), which is incorporated herein by reference.

In contrast, circuit-switched telephone networks, such as the public switched telephone network (PSTN), typically carry voice or media in an uncompressed digital format, such as a pulse code modulation (PCM) format. For example, in a typical PCM format, a voice signal is sampled at a rate of 8000 times a second and digitized with an 8-bit resolution, resulting in a 64 Kbps signal. Trunks used in the PSTN are often able to carry many of these 64 Kbps signals at a time, in separate channels. For example, a T-1 trunk is able to carry 24 of these 64 Kbps channels.

Because of the differences between these digital formats, wireless telecommunications systems often use transcoders to convert between the compressed digital formats used by mobile stations and the PCM format used by circuit-switched telephone networks. Using transcoders can result in inefficiencies, however. For example, if a call involves two mobile stations, then the voice or other media exchanged in the call may be transcoded twice. One transcoder may convert the media from the transmitting mobile station to PCM format for transmission through the PSTN, and another transcoder may convert the media from the PCM format to the compressed media format for transmission to the receiving mobile station. Using transcoders "in tandem" in this way is often undesirable because each transcoder can add delay to the transmission and can degrade the quality of the voice or other media.

To address these concerns, various proposals have been made to provide "tandem free operation" (TFO) in calls between mobile stations, in which the transcoders are bypassed and the PSTN carries media in the compressed digital format without transcoding. One such approach is described in $3^{rd}$ Generation Partnership Project 2, "CDMA Tandem Free Operation," 3GPP2 A. S0004-B v2.0 (Aug. 5, 2002). In this approach, an inband signaling protocol is used to test if the call is a mobile-to-mobile call, that the mobile stations use the same compressed digital format, and that the systems at both end of the call support tandem free operation. If these tests are successful, the inband signaling protocol establishes a "transparent" digital channel through the PSTN, and the transcoders are bypassed. The media is carried through the PSTN in the original compressed digital format, in 16 Kbps "TFO frames" that are mapped onto the two least significant bits in a 64 Kbps PCM frame.

This TFO approach still has a number of disadvantages. First, some network elements in the PSTN may need to be modified to be compliant with this TFO approach. Second, a significant amount of inband signaling may be required to establish the "transparent" connection. Accordingly, there is still a need to provide efficient systems and methods for tandem free operation.

SUMMARY

In a first principal aspect, exemplary embodiments of the present invention provide a system for tandem free operation in a wireless telecommunications system in which a first network carries media in a first media format and at least one mobile stations transmits and receives media in a second media format. The system comprises a gateway, a transceiver system for wirelessly communicating with the at least one mobile station, and a switching system connected to the first network and the gateway. The switching system switches calls to and from the at least one mobile station via the transceiver system. These calls include tandem free calls wherein the switching system exchanges media in the second media format with the gateway.

In a second principal aspect, exemplary embodiments of the present invention provide a method of establishing a call between a first mobile station and a second mobile station. The first mobile station is served by a first serving system and transmits and receives media in a compressed digital format. The first serving system is connected to a circuit-switched telephone network and to a first gateway. In accordance with the method, a request from the first mobile station to originate a call to the second mobile station is received. A second serving system to which to route the call to reach the second mobile station is identified. The second serving system's accessibility via the first gateway is determined. The call is routed to the second serving system via the first gateway. The first and second serving systems exchange media in the call in the compressed digital format via the first gateway.

In a third principal aspect, exemplary embodiments of the present invention provide a method of handing off a mobile station from a first serving system to a second serving system. The mobile station is involved in a call in which the mobile station transmits and receives media in a compressed digital format. The first and second serving systems are interconnected by at least one trunk and at least one gateway. In accordance with the method, the first serving system transmits a handoff message to the second serving system. The handoff message identifies the mobile station and specifies using the at least one gateway for handing off the mobile station. The call is extended through the at least one gateway. The first and second serving systems exchange media in the call in the compressed digital format via the at least one gateway.

DETAILED DESCRIPTION OF EXEMPLARY EMBODIMENTS

1. Exemplary Architecture

Figure 1:
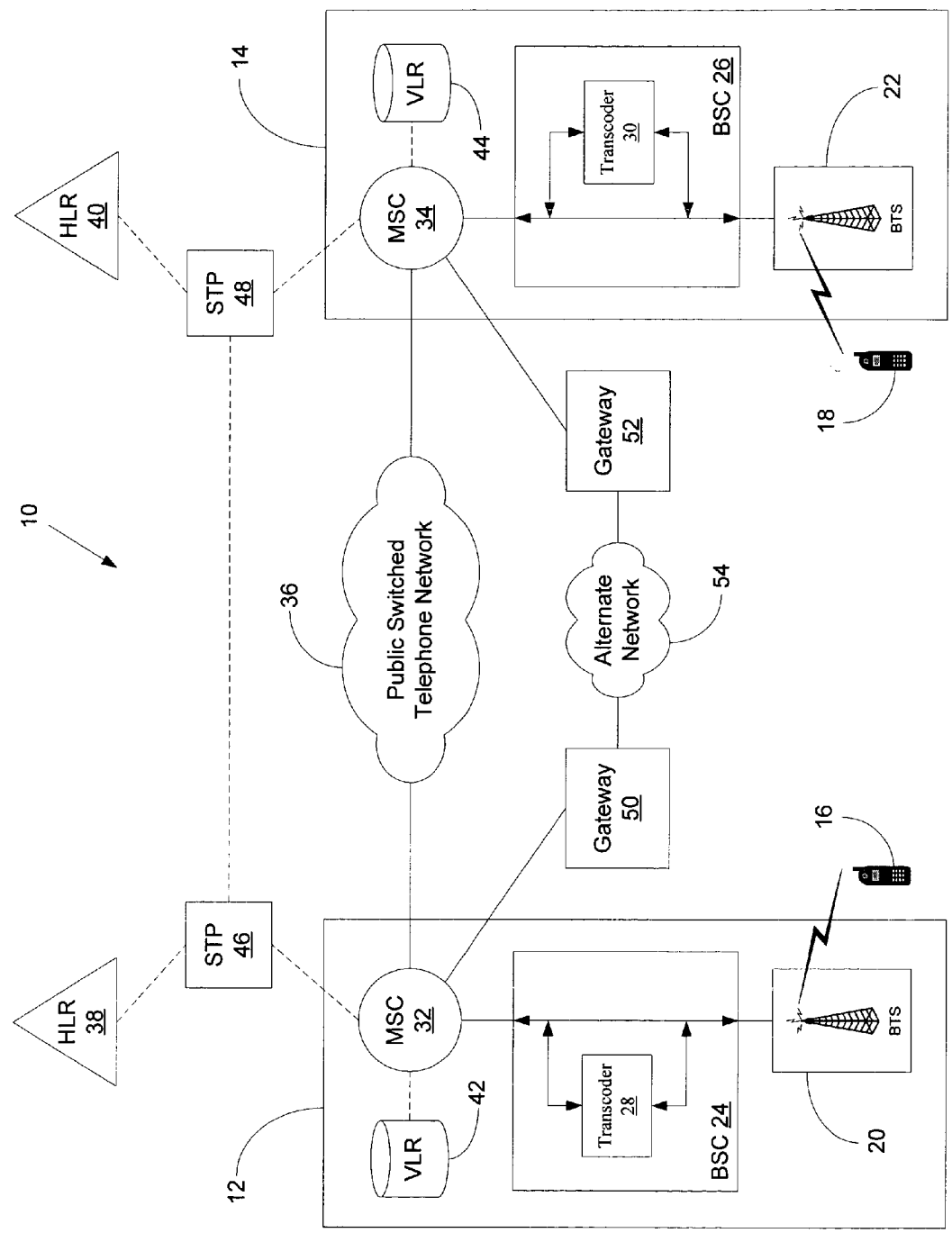
FIG. 1 is a block diagram of a wireless telecommunications system, in accordance with an exemplary embodiment of the present invention.

Referring to the drawings, FIG. 1 is a simplified block diagram of an exemplary wireless telecommunications system 10 in which exemplary embodiments of the present invention may be employed. In FIG. 1, connections that carry primarily bearer traffic are indicated by solid lines and connections that carry primarily signaling traffic are indicated by dashed lines.

Wireless telecommunications system 10 includes serving systems 12 and 14 for providing wireless telecommunications services to mobile stations, such as mobile stations 16 and 18. In some cases, serving systems 12 and 14 may be associated with different wireless service providers. In other cases, serving systems 12 and 14 may be associated with the same wireless service provider. Mobile stations 16 and 18 may be wireless telephones, wireless personal digital assistants (PDAs), wirelessly equipped laptop computers, or other devices that are able to transmit and receive voice or other media over an air interface.

Serving system 12 includes a base transceiver station (BTS) 20 that provides a wireless coverage area within which BTS 20 may communicate with one or more mobile stations, such as mobile station 16, over an air interface. Similarly, serving system 14 includes a BTS 22 that provides a wireless coverage area within which BTS 22 may communicate with one or more mobile stations, such as mobile station 18, over an air interface. Although FIG. 1 shows serving systems 12 and 14 with only one BTS each, serving systems 12 and 14 may each include a plurality of BTSs. In addition, although FIG. 1 shows mobile station 16 communicating with BTS 20 over an air interface and mobile station 18 communicating with BTS 22 over an air interface, mobile stations 16 and 18 may be able to roam into other areas and communicate with other BTSs in other serving systems. Thus, mobile station 16 may be able to communicate with BTS 22, and mobile station 18 may be able to communicate with BTS 20.

The wireless communication between BTS 20 and mobile station 16 and the wireless communication between BTS 22 and mobile station 18 may occur in the same air interface format or a different air interface format. The air interface formats used by BTSs 20 and 22 may include digital formats, such as CDMA, TDMA, and/or GSM, and/or analog formats, such as AMPS. Preferably, CDMA is used. Applicable CDMA formats are described, for example, in TIA/EIA/IS-95-B (published Oct. 31, 1998) and in the TIA/EIA/IS-2000 Series, Rev. A-2 (published April 2002), which are incorporated herein by reference.

Serving systems 12 and 14 may also include base station controllers (BSCs) 24 and 26 connected to BTSs 20 and 22, respectively. Although FIG. 1 shows BSCs 24 and 26 connected to only one BTS each, BSCs 24 and 26 may each be connected to a plurality of BTSs. BSCs 24 and 26 may be used to control the BTSs to which they are connected. BSCs 24 and 26 may also include transcoders 28 and 30, respectively, for converting between media formats, as described in more detail below. Although FIG. 1 shows transcoders 28 and 30 as being located in BSCs 24 and 26, respectively, transcoders 28 and 30 could be otherwise located in serving systems 12 and 14.

Serving systems 12 and 14 include mobile switching centers (MSCs) 32 and 34 connected to BSCs 24 and 26, respectively. Although FIG. 1 shows MSCs 32 and 34 connected to only one BSC each, MSCs 32 and 34 may each be connected to a plurality of BSCs. MSCs 32 and 34 function to connect calls to and from mobile stations, such as mobile station 16 and 18, via BSCs and BTSs, such as BSCs 24 and 26 and BTSs 20 and 22, respectively. In this regard, MSCs 32 and 34 are connected to a circuit-switched telephone network, e.g., public switched telephone network (PSTN) 36 and may use a signaling system, such as SS7, to send and receive calls through PSTN 36. MSCs 32 and 34 may also use a signaling system, such as IS-41, to signal to each other, to other MSCs, to home location registers (HLRs), such as HLRs 38 and 40, and to visitor location registers (VLRs), such as VLR 42 and 44. A recent revision of the IS-41 specifications, ANSI/TIA/EIA-41-D-97, published in December 1997, is incorporated herein by reference. The SS7 and IS-41 signaling may occur via one or more signal transfer points (STPs), such as STPs 46 and 48. Although SS7 and IS-41 are described herein as exemplary signaling systems, it is to be understood that MSCs 32 and 34 could use other signaling systems instead of or in addition to SS7 and IS-41.

Each of HLRs 38 and 40 may keep track of mobile stations subscribing to a particular wireless service provider. For example, HLR 38 may keep track of mobile stations subscribing to a wireless service provider associated with serving system 12, and HLR 40 may keep track of mobile stations subscribing to a different wireless service provider associated with serving system 14. VLRs 42 and 44 keep track of mobile stations operating in areas served by serving system 12 and 14, respectively. Although FIG. 1 shows VLRs 42 and 44 as being separate from MSCs 32 and 34, VLRs 42 and 44 could instead be integrated with MSCs 32 and 34.

By using appropriate SS7, IS-41, and/or other signaling, MSC 32 may connect incoming calls from PSTN 36 to mobile stations operating in areas served by serving system 12. Such calls may originate from landline telephones, mobile stations (e.g., mobile stations operating in areas served by serving system 14), or other communication devices. Similarly, MSC 32 may connect calls originating from mobile stations operating in areas served by serving system 12 to their destinations, via PSTN 36. Such destinations may include landline telephones, mobile stations (e.g., mobile stations operating in areas served by served system 14), or other communication devices. MSC 34 may connect calls in a similar manner.

In many cases, mobiles stations, such as mobile stations 16 and 18 may transmit and receive media, such as voice, in a format different than the format in which media is carried in PSTN 36. In particular, PSTN 36 may carry media in a pulse code modulation (PCM) format, whereas mobile stations 16 and 18 may transmit and receive media in a compressed digital format. The compressed digital format could be, for example, an Enhanced Variable Rate Coder (EVRC) format or a Selectable Mode Vocoder (SMV) format. However, other compressed digital formats could be used.

Transcoders 28 and 30 may be used to convert between the different media formats used by mobile stations and by PSTN 36. In particular, transcoder 28 may convert between the compressed digital format used by mobile stations, such as mobile station 16, served by serving system 12 and the PCM format used by PSTN 36. Transcoder 30 may function in a similar manner. Similarly, transcoder 30 may convert between the compressed digital format used by mobile stations, such as mobile station 18, served by serving system 14 and the PCM format used by PSTN 36. Transcoders 28 and 30 may be able to support multiple compressed digital formats.

For purposes of illustration, mobile stations 16 and 18 may be described herein as both using EVRC to transmit and receive voice and that transcoders 28 and 30 are both able to convert between EVRC and PCM. It is to be understood, however, that, in general, mobile stations 16 and 18 may use different compressed digital formats, and that transcoders 28 and 30 may not support the same compressed digital formats.

Transcoders 28 and 30 may also be selectively bypassed. In particular, BSC 24 may be able to convey media between BTS 20 and MSC 32 either directly (i.e., without transcoding) or via transcoder 28, as controlled by MSC 32. Transcoder 30 may similarly be bypassed in BSC 26. Either MSC 32 (or MSC 34) may bypass transcoder 28 (or transcoder 30) for a given call, if, for example, both endpoints of the call use the same compressed digital format. For example, if mobile stations 16 and 18 (both using EVRC) are the endpoints of the call, then MSCs 32 and 34 may control BSCs 24 and 26 to bypass transcoders 28 and 30, respectively. MSCs 32 and 34 may also be able to exchange media in the original compressed digital format from mobile stations 16 and 18 via PSTN 36. For example, MSCs 32 and 34 may engage in in-band signaling to establish a "transparent" TFO connection through PSTN 36. Once the TFO connection is established, MSCs 32 and 34 may exchange EVRC, coded into specialized TFO frames, via PSTN 36.

In accordance with exemplary embodiments of the present invention, MSCs 32 and 34 may also be connected to gateways 50 and 52, respectively. Gateways 50 and 52 may be dedicated to conveying media in EVRC (or other compressed digital format). An alternative network 54 may interconnect gateways 50 and 52. In an exemplary embodiment, alternative network 54 is a packet-switched network that may include one or more local area networks (LANs) and/or one or more wide area networks (WANs), such as the Internet. As a packet-switched network, alternative network 54 may route packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. In addition, higher-level applications and protocols, such as the Session Initiation Protocol (SIP), may be carried as UDP/IP or TCP/IP packets. Relevant aspects of SIP are described in Rosenberg, et al., "SIP: Session Initiation Protocol," Request for Comments 3261 (June 2002), which is incorporated herein by reference. Voice or other media may be carried in alternative network 54 in a real-time packet media format, e.g., by using the real-time transport protocol (RTP). More particular, alternative network 54 may carry the media transmitted by mobile stations in the original compressed digital format, using RTP. Relevant aspects of RTP are described in Schulzrinne, et al., "RTP: A Transport Protocol for Real-Time Applications," Request for Comments 1889 (January 1996), which is incorporated herein by reference.

Although FIG. 1 shows only MSCs 32 and 34 accessible via alternate network 54, other systems may also be accessible via alternate network 54. For example, other gateways may also be connected to alternative network 54, and other switching systems, such as MSCs, may be connected to these other gateways. In addition, MSCs 32 and 34 may each be connected to more than one gateway. As described in more detail below, MSCs 32 and 34 may use gateways 50 and 52, respectively, to convey media without transcoding, i.e., in the original compressed digital format, and without going through PSTN 36.

2. Exemplary Operation

In exemplary embodiments, MSC 32 (or MSC 34) may use gateway 50 (or gateway 52) for calls, instead of PSTN 36, in certain situations. For example, if one endpoint of the call is a mobile station served by serving system 12 and the other endpoint is another mobile station using the same compressed digital format and being served by serving system 14 or other serving system accessible via gateway 50, then MSC 32 may use gateway 50, instead of PSTN 36, to communicate with the other serving system. In addition, MSC 32 may control BSC 24 so that transcoder 28 is bypassed, and the transcoder in the other serving system may be similarly bypassed. In this way, the call may be tandem free, in that the serving systems may use gateway 50 to exchange media in the original compressed digital format, without transcoding.

As another example, if serving system 12 is serving a mobile station engaged in a tandem free call and the mobile station then moves into an area better served by serving system 14 (or other serving system accessible via gateway 50), then to hand off the call, MSC 32 may extend the call pathway through gateway 50. The other serving system bypasses its transcoder and may exchange media in the original compressed digital format, without transcoding, with serving system 12, via gateway 50. In this way, a tandem free call may be maintained as a tandem free call after handoff to another serving system.

a. Tandem Free Call Origination

When a mobile station being served by serving system 12, such as mobile station 16, is involved in a call with another mobile station that uses the same compressed digital format and is being served by another serving system accessible via gateway 50, the call may be carried by gateway 50 and alternate network 54, instead of PSTN 36. In addition, transcoder 28 and the transcoder in the other serving system may be bypassed. This tandem free call through gateway 50 may be established either when mobile station 16 originates a call or when mobile station 16 terminates a call.

Figure 2:
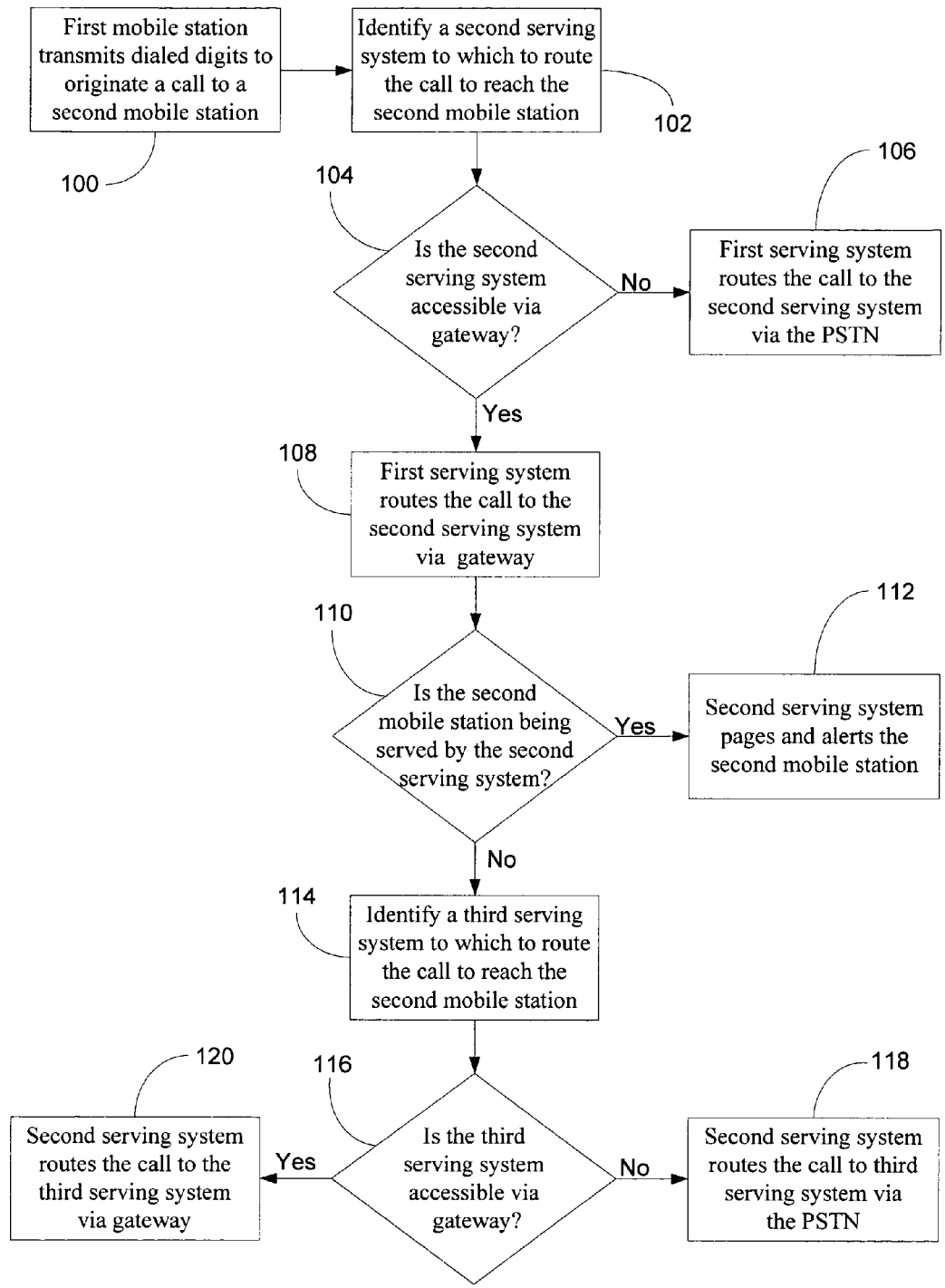
FIG. 2 is a flow chart of an exemplary call origination process, in accordance with an exemplary embodiment of the present invention.

The process of mobile station 16 originating a call while being served by serving system 12 is exemplary. FIG. 2 is a flow chart of an exemplary call origination process. The process may begin when the user of a first mobile station, shown as mobile station 16 in FIG. 1, dials digits to place a call to a second mobile station, shown as mobile station 18 in FIG. 1. The first mobile station transmits the dialed digits to originate the call to the second mobile station, as indicated by step 100. The first mobile station may also transmit an indication of what specific compressed digital format the first mobile station is requesting to use for the call.

The first serving system, shown as serving system 12 in FIG. 1, serving the first mobile station receives the dialed digits. In this example, the second mobile station is not also being served by the first serving system. As a result, the first serving system identifies a second serving system to which to route the call to reach the second mobile station, as indicated by step 102. This identification may occur in different ways. If the second mobile station has the first serving system as its "home" system, then the first serving system may locate the second mobile station by querying the second mobile station's HLR. For example, serving system 12 may send HLR 38 an IS-41 LOCREQ message that include the dialed digits in order to identify the second mobile station, i.e., mobile station 18. HLR 38 then determines that mobile station 18 is currently being served by serving system 14, e.g., based on the most recent registration by mobile station 18. To obtain routing instructions, HLR 38 may send serving system 14 an IS-41 ROUTEREQ message that identifies mobile station 18 by mobile directory number (MDN), mobile identification number (MIN), mobile station identification (MSID), electronic serial number (ESN), and/or other identifier. Serving system 14 may then respond with an IS-41 routereq return result message that includes a temporary location directory number (TLDN). HLR 38 may then forward the TLDN to the first serving system, i.e., serving system 12, in an IS-41 locreq return result message. The first serving system may then identify serving system 14 from this TLDN.

If, on the other hand, the second mobile station does not have the first serving system as its "home" system, then the first mobile station may not determine which serving system is actually serving the second mobile station. Instead, the first serving system may simply identify the second mobile station's home system (e.g., based on the dialed digits) as the serving system to which to route the call to reach the second mobile station.

Once the first serving system has identified the second serving system to which to route the call to reach the second mobile station, the first serving system determines whether the second serving system is accessible via its gateway, i.e., gateway 50, as indicated by step 104. In particular, some serving systems, such as serving system 14, may be connected to alternative network 54 and, thus, accessible via gateway 50. Other serving systems may not be connected to alternative network 54, and, thus, not accessible via gateway 50 (but may still be accessible via PSTN 36. The first serving system may make the determination of step 104 in a number of different ways. For example, the first serving system may maintain its own database of information regarding which serving systems are accessible via its gateway. Alternatively, the first serving system may query another source, such as an HLR, to determine whether the second serving system is accessible via gateway 50.

If the second serving system is not accessible via gateway 50, then the first serving system may route the call to the second serving system via PSTN 36, as indicated by step 106. In that case, the first serving system, i.e., serving system 12, may use transcoder 28 to convert between the compressed digital format used by the first mobile station and the uncompressed format used in PSTN 36. Alternatively, the first serving system may engage in in-band signaling to establish a "transparent" TFO connection through PSTN 36.

If the second serving system is accessible via gateway 50, then the first serving system routes the call to the second serving system via gateway 50, as indicated by step 108. In addition, serving system 12 may bypass transcoder 28 for media exchanged in the call. Thus, serving system 12 and gateway 50 may exchange media in the compressed digital format used by the first mobile station, i.e., mobile station 16. Similarly, alternative network 54 may carry the media exchanged in the call in the compressed digital format used by mobile station 16, albeit in a real-time packet format, e.g., using RTP. To route the call to the second serving system's gateway (e.g., gateway 52), gateway 50 may use SIP signaling, identifying the second mobile station by MIN, MDN, MSID, or other identifier, to set up a session through alternative network 54. The signaling may also identify the first mobile station and the specific compressed digital format that the first mobile station requested for the call. Alternatively, gateway 50 may simply route packets to gateway 52 using TCP/IP or UDP/IP without setting up a session.

When the second serving system, i.e., serving system 14, receives the call via gateway 52, serving system 14 may determine whether it is currently serving the second mobile station, i.e., mobile station 18 (e.g., by querying VLR 44), as indicated by step 110. If mobile station 18 is currently being served by serving system 14, then serving system 14 may page and alert mobile station 18, as indicated by step 112.

If mobile station 18 is prepared to use the same compressed digital format requested by mobile station 16, then serving system 14 may simply bypass transcoder 30 for the media exchanged in the call. In this way, when mobile station 18 answers, mobile stations 16 and 18 may exchange media in the same compressed digital format in a tandem free manner, i.e., without transcoding. Thus, if mobile stations 16 and 18 both use EVRC, then mobile station 16 and serving system 12 may exchange media in the EVRC format without transcoding, i.e., bypassing transcoder 28, serving systems 12 and 14 may exchange media in the EVRC format (via gateway 50, alternative network 54, and gateway 52) without transcoding, and serving system 14 and mobile station 18 may exchange media in the EVRC format without transcoding, i.e., bypassing transcoder 30.

If, however, mobile station 18 is not prepared to use the specific compressed digital format requested by mobile station 16, then other options may be available. In one approach, serving systems 12 and 14 may engage in signaling, via gateways 50 and 52, to negotiate a common compressed digital format that mobile stations 16 and 18 are both able to use for the call. Serving systems 12 and 14 would then instruct mobile stations 16 and 18, respectively, to use this common compressed digital format for the call. In this way, transcoders 28 and 30 may still be bypassed, and the call may still be tandem free.

In another approach, the compressed digital format used by mobile station 16 could be transcoded into the compressed digital format used by mobile station 18. Preferably, the transcoder for this transcoding could be located in one of gateways 50 and 52, most preferably, the termination gateway 52. Although some transcoding is used in this approach, because only one stage of transcoding is used, the resulting media quality may be higher than if the call had been routed through PSTN 36, with two transcoders acting in tandem.

On the other hand, if no common compressed digital format is available, and single-stage transcoding is not available, then transcoders 28 and 30 may be used for the call. In that case, the media exchanged during the call would be carried by alternative network 54, rather than by PSTN 36, but in the same or similar uncompressed digital format used by PSTN 36. Because this fall-back approach does not result in tandem free operation, the first serving system may use its gateway for the call only when it appears likely, e.g., based on the identity of the second serving system, the identity of the second mobile station, and/or other factors, that a common compressed digital format could be used for the call.

If the second serving system is not currently serving the second mobile station, then the second serving system may identify a third serving system to which to route the call to reach the second mobile station, as indicated by step 114. The second serving system may identify the third serving system by querying an HLR associated with the second mobile station. For example, the second serving system may send a LOCREQ query to HLR 40 and, in response, receive a TLDN corresponding to the third serving system where the second mobile station is currently operating. The second serving system may then determine whether the third serving system is accessible via its gateway, i.e., gateway 52, as indicated by step 116. The second serving system may make this determination, for example, by consulting its own database of information or by querying an HLR.

If the third serving system is not accessible via gateway 52, then the second serving system may route the call to the third serving system via PSTN 36, as indicated by step 118. The third serving system may then page and alert the second mobile station. The second serving system may use transcoder 30 to transcode the media exchanged during the call. In that case, during the call, the first and second serving systems may exchange media in the compressed digital format (via gateway 50, alternative network 54, and gateway 52), but the second and third serving systems may exchange media in uncompressed format (via PSTN 36). Alternatively, the second serving system could bypass transcoder 30 and engage in in-band signaling to set up a "transparent" TFO connection through PSTN 36.

If the third serving system is accessible via gateway 52, then the second serving may route the call to the third serving system via gateway 52, as indicated by step 120. When the third serving system receives the call, it may page and alert the second mobile station. In addition, the second and third serving systems may bypass their respective transcoders for the media exchanged in the call. In this way, the first and second mobile stations may exchange media in the same compressed digital format in a tandem free manner, i.e., without transcoding.

b. Tandem Free Call Handoff

When a mobile station being served by serving system 12 is involved in a tandem free call and moves into an area served by another serving system, serving system 12 may use gateway 50 to hand off the mobile station to the other serving system. In particular, serving system 12 may extend the call pathway through gateway 50, and the other serving system may bypass its transcoder so that the call may remain tandem free.

Figure 3:
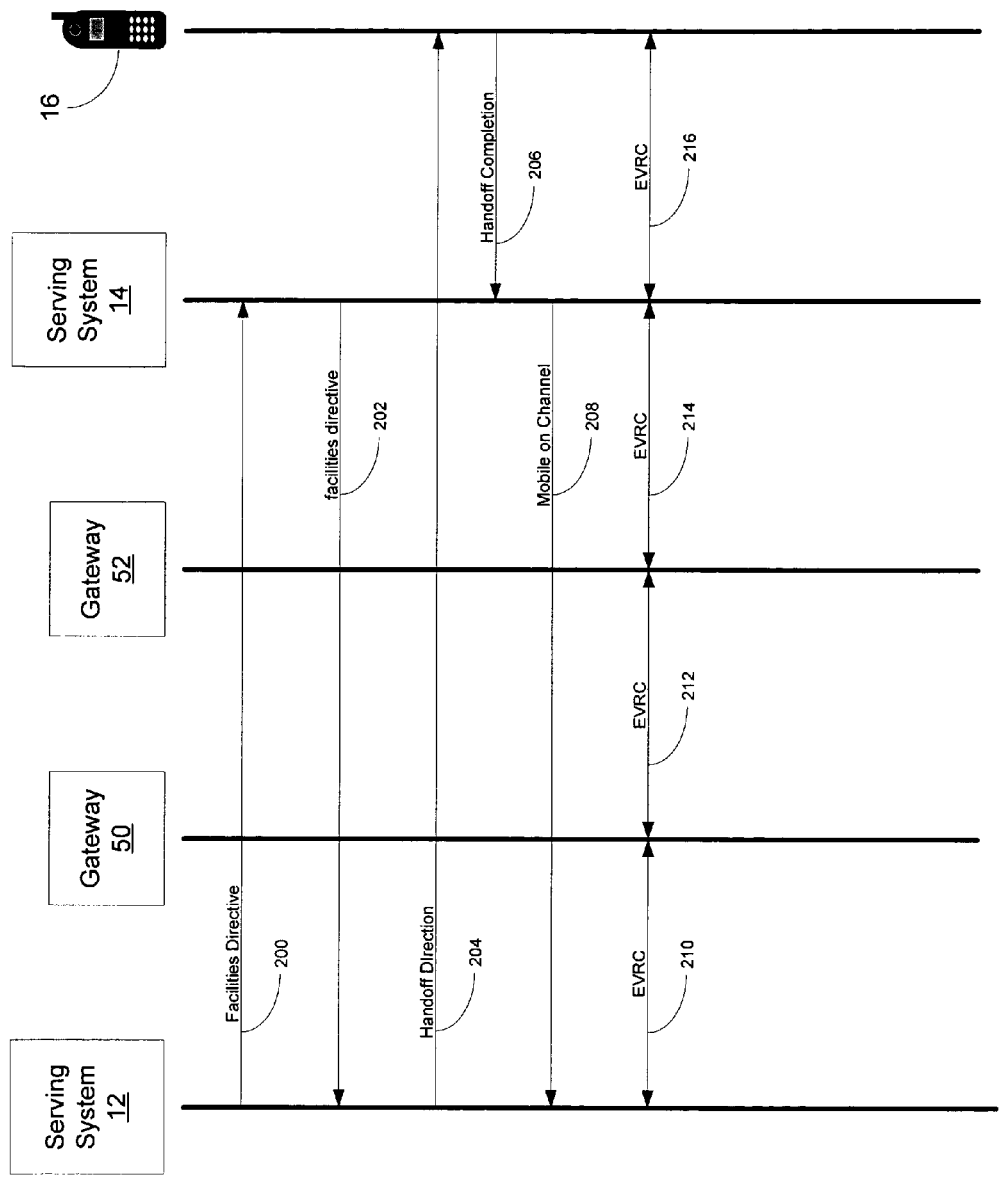
FIG. 3 is a call flow diagram of an exemplary handoff process, in accordance with an exemplary embodiment of the present invention.

FIG. 3 is a simplified call flow diagram for the exemplary case of serving system 12 handing off mobile station 16 to serving system 14. Mobile station 16 may be involved in a tandem free call with another mobile station. The other mobile station may be being served by serving system 12 or by another serving system. For example, the other serving system may be in communication with serving system 12 via PSTN 36 (e.g, using a "transparent" TFO connection) or via gateway 50 (e.g., for a tandem free call as described above).

The process may begin when serving system 12 determines that mobile station 16 may be better served by serving system 14. This may be because mobile station 16 has moved into an area in which serving system 14 provides better wireless coverage, e.g., as indicated by pilot strength measurements reported by mobile station 16. Alternatively, serving system 12 may attempt to handoff mobile station 16 to serving system 14 because serving system 12 is experiencing very high usage or because of some other reason. To initiate the handoff, serving system 12 may send serving system 14 an IS-41 Facilities Directive message, as indicated by step 200. The Facilities Directive message may identify mobile station 16, such as by MIN, or MSID.

In the conventional approach, a handoff would extend the call pathway to MSC 34 using a dedicated inter-MSC trunk. In this case, however, serving system 12 identifies serving system 14 as being accessible via gateway 50, alternate network 54, and gateway 52. As a result, serving system 12 may include in the Facilities Directive message of step 200 a code indicating that gateway 52 will be used for the handoff. For example, IS-41 provides for a Facilities Directive parameter, InterMSCCircuitID, that specifies a trunk in a dedicated trunk group between the two MSCs to be used for the handoff. Thus, in the Facilities Directive message of step 200, the InterMSCCircuitID parameter may specify gateway 52 to be used for a handoff, rather than a trunk. Alternatively, the code indicating the use of gateway 52 may be included in other fields of the Facilities Directive message.

Serving system 14 may respond with an IS-41 facilities directive return result message, as indicated by step 202, to accept the handoff. Serving system 12 may then transmit a Handoff Direction message to mobile station 16, as indicated by step 204, directing mobile station 16 to a new channel for wireless communication with serving system 14. Mobile station 16 may tune to the new channel and transmit a Handoff Completion message, as indicated by step 206. Serving system 14 may then transmit an IS-41 Mobile on Channel message to serving system 12 to indicate that mobile station 16 is now communicating with serving system 14. Serving system 14 may also register mobile station 16 in VLR 44 and in the HLR associated with mobile station 16, e.g., HLR 38.

At that point serving system 12 may extend the call pathway to serving system 14, via gateway 50, alternate network 54, and gateway 52. In this way, serving system 12 and serving system 14 may exchange media in the compressed digital format used by mobile station 16 (e.g., EVRC), without transcoding, via gateway 50, alternate network 54, and gateway 52, as indicated by steps 210, 212, and 214. In addition, serving system 14 and mobile station 16 exchange media in the compressed digital format (e.g., EVRC), with transcoder 30 bypassed, as indicated by step 216. In this way, a tandem free call may be maintained as tandem free, even when one or both mobile stations involved in the call moves into an area served by a different serving system.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of handing off a mobile station from a first serving system to a second serving system, said mobile station being involved in a call in which said mobile station transmits and receives media in a compressed digital format, said method comprising:

said first serving system transmitting a handoff message to said second serving system, said second serving system being interconnected with said first serving system by at least one voice trunk and by a packet-switched network, said handoff message identifying said mobile station and specifying a gateway connecting said second serving system to said packet-switched network for handing off said mobile station;

extending said call through said packet-switched network and said gateway; and said first and second serving systems exchanging media in said call in said compressed digital format via said gateway and said packet-switched network.

2. The method of claim 1, further comprising:

registering said mobile station with said second serving system; and said second serving system conveying media to and from said mobile station without transcoding.

3. The method of claim 1, wherein said call is a tandem free call with another mobile station.

4. The method of claim 1, wherein said compressed digital format is an Enhanced Variable Rate Coder (EVRC) format.

* * * * *